Sept. 21, 1965   J. L. WILLIAMS   3,207,471
GATE VALVE HAVING SEAT REMOVABLE THROUGH FLOW PASSAGE
Filed March 12, 1962

INVENTOR.

JOHN L. WILLIAMS

BY
BUCKHORN, CHEATHAM & BLORE
ATTORNEYS

United States Patent Office 3,207,471
Patented Sept. 21, 1965

3,207,471
GATE VALVE HAVING SEAT REMOVABLE
THROUGH FLOW PASSAGE
John L. Williams, 17467 NE. West View Road,
Oswego, Oreg.
Filed Mar. 12, 1962, Ser. No. 178,898
8 Claims. (Cl. 251—328)

This invention relates to a gate valve of the type having a replaceable elastomer seat, and particularly relates to a valve generally similar to that shown in the application of John L. Williams, entitled "Valve Having Seat-Carrying Flange," Serial No. 90,830, filed February 21, 1961, but differing in that the seat construction of the present invention is intended for larger size valves. The just-mentioned application has been abandoned in favor of a subsequent application which issued into United States Patent 3,164,363.

It is a main object of the present invention to provide an elastomer seat unit that is removably secured in place in a flow passage next to the path of travel of a gate blade and which is of a size to enable it to be passed into the flow passage of the valve from an end of the passage and installed in place, all without requiring any disassemblage of the valve body.

It is a further object to provide such a construction in which the mounting arrangement for the elastomer seat unit also determines the pressure of contact between the gate blade and the elastomer unit.

Another object is to provide such a seat unit that can be installed in an existing gate valve having a metal ring type seat.

Various other objects of the invention will be apparent from the following description taken in connection with the accompanying drawings wherein.

Figure 1:
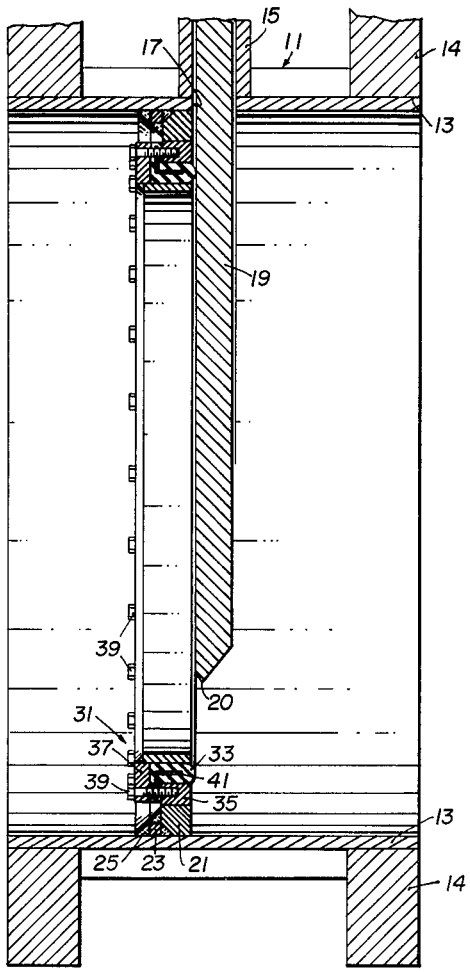
FIG. 1 is a vertical longitudinal mid-sectional view through a gate valve embodying the concepts of the present invention.

Referring to the drawings, FIG. 1 shows a portion of a gate valve having a body 11 which includes a circular tubular flow passage member 13 having bolting flanges 14 at its ends. The body also includes tubular chest 15 secured to the flow member 13. The chest cavity communicates with the interior of the flow member 13 by way of a slot 17 formed in the latter.

A gate blade 19 is movably mounted in the chest cavity and projects through the slot 17 into the flow passage defined by the member 13. The blade has a semicircular lower end which is beveled on its opposite edges to define a knife edge 20. The edge is slightly spaced from the downstream side of the blade, the left-hand side as the parts are shown in FIG. 1.

The upper portion of the blade 19 passes through a packing gland assembly (not shown) but which is like that disclosed in said application Serial No. 80,830. The blade is raised and lowered by a mechanism (not shown) like that in said application.

Figure 2:
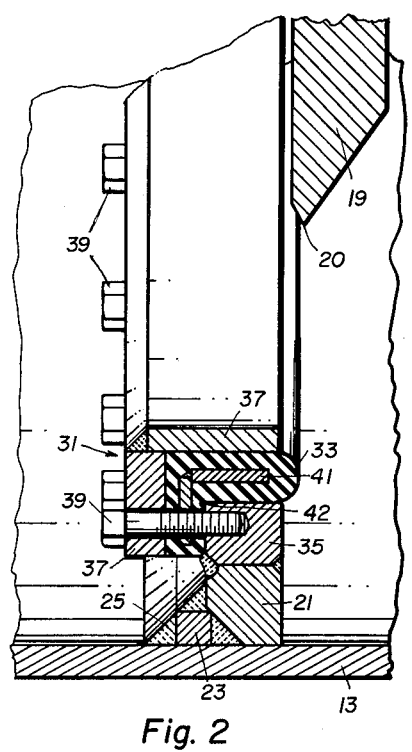
FIG. 2 is an enlarged view of a portion of FIG. 1 to better show the construction of the seat unit.

Insofar as the seating structure of the present valve is concerned, FIGS. 1 and 2 show a conversion arrangement for a gate valve already in use and having a metal seating ring 21 welded in place within the flow member 13. Prior to installing the elastomer unit of the present invention, the blade of the valve in FIG. 1 engaged the upstream side of the ring 21. The smaller ring 23 is merely a filler piece to enable the weld 25 to fill in the space behind the ring 21 to enable the ring 21 to resist the large forces imposed thereon by the blade, which forces are created by the upstream pressure, particularly when the blade 19 is fully closed.

To convert the valve, the elastomer seating unit generally entitled 31 is mounted on the ring 21. The unit includes an annular elastomer element 33 of right angular cross section which is sandwiched between a mounting ring 35 of generally rectangular cross section and a retaining ring 37 of right angular cross section. The ring 37 is secured to the mounting ring 35 by a plurality of bolts 39 which pass through the vertical leg of ring 37 and through the element 33 and thread into the rear face of ring 35. These bolts also pass through an annular reinforcing element 41 of right angular cross section which is centrally embedded within the elastomer element 33. The rings 21 and 35, together, may be considered as an annular mounting member.

The horizontal leg of the elastomer element 33 projects beyond the right hand edges of the rings 35 and 37 and is rounded for proper engagement with the rear or downstream face of the blade 19.

To install the unit 31, the unit is disassembled (or if already disassembled, it is left disassembled) and the mounting ring 35 is welded to the seat ring 21 in interior concentric relation with respect thereto, with the right-hand face of the rings 21 and 35 flush with one another. Then the elastomer element 33 is fitted on the ring 35, and the ring 37 fitted on the element 33. The bolts are next passed through the ring 37 and the element 33 and threaded into the mounting ring 35. The bolts are tightened with the aid of a torsion wrench set at a desired setting to compress the element 33 a predetermined amount, which is readily determined by the installer. That is to say, the bolts are tightened sufficiently to attain the desired contact pressure between the elastomer element 33 and the blade 19. When this contact pressure lessens because of wear, it may be reattained by further tightening the bolts 39. Tightening the bolts creates an extruding force on the element 33 tending to cause increased projection of the horizontal leg of the elastomer element.

The mounting ring 35 is provided on its rear inner margin with a rib or bead 42 (FIG. 2) which prevents the vertical leg of the element from being extruded an undesirable extent.

It is pointed out that the packing gland assembly of the valve enables lateral adjustment of the blade 19 to enable it to properly engage the element 33 without engaging the ring 21, which previously functioned as the seat for the blade.

Figure 3:
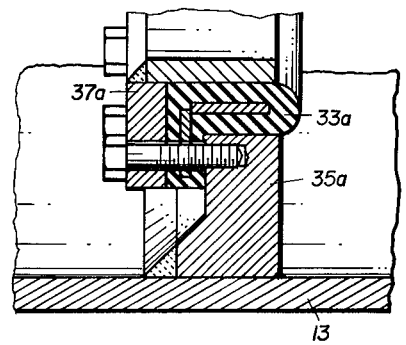
FIG. 3 shows a modified form of the invention.

FIG. 3 shows the seating arrangement for a newly fabricated valve rather than a converted valve. In FIG. 3 there is a mounting ring 35a which is welded to the interior of the member 13 and on which the elastomer element 33a and a retaining ring 37a are mounted. The ring 35a may be considered as an annular mounting member.

Having described the invention in what is considered to be the preferred embodiment thereof, it is desired that it be understood that the invention is not to be limited other than by the provisions of the following claims.

I claim:
1. In a gate valve having a body provided with end flanges for securement to the flanges of pipes to be associated with said valve,
    said body having a flow passage,
    a gate blade movable across said flow passage,
    and an elastomer seat unit mounted within said flow passage intermediate the ends thereof,
    said unit being of a size to be entirely passed into said flow passage to its final position,
    said unit including a rigid annular mounting member welded to the wall of said body which defines the flow passage,
    said unit being separate from said body flanges, said unit including annular elastomer means projecting into the path of travel of said blade,
said unit including rigid annular retaining means mounting said elastomer means on said mounting member,
said unit including elastomer means forming a continuous annular seal between said retaining means and said mounting member.

2. In a gate valve having a body provided with end flanges for securement to the flanges of pipes to be associated with said valve,
said body having a flow passage,
a gate blade movable across said flow passage,
and an elastomer seat unit mounted within said flow passage intermediate the ends thereof,
said unit being of a size to be entirely passed into said flow passage to its final position,
said unit including a rigid annular mounting member welded to the wall of said body which defines the flow passage,
said unit being separate from said body flanges,
said unit including annular elastomer means projecting into the path of travel of said blade,
said unit including rigid annular retaining means mounting said elastomer means on said mounting member,
said unit including elastomer means forming a continuous annular seal between said retaining means and said mounting member,
and means for varying the pressure of contact between said elastomer element and said blade.

3. In a gate valve having a body provided with end flanges for securement to the flanges of pipes to be associated with said valve,
said body having a flow passage,
a gate blade movable across said flow passage,
and an elastomer seat unit mounted within said flow passage intermediate the ends thereof,
said unit being of a size to be entirely passed into said flow passage to its final position,
said unit being separate from said body flanges,
said unit including a rigid annular mounting member welded to the wall of said body which defines the flow passage,
said unit including an annular elastomer element projecting into the path of travel of said blade and forming a continuous annular seal with said mounting member,
and means independent of said gate blade for adjusting the position of the blade-contacting portion of the elastomer element to vary the pressure of contact between the elastomer element and the blade.

4. In a gate valve having a body provided with end flanges for securement to the flanges of pipes to be associated with said valve,
said body having a flow passage,
a gate blade movable across said flow passage,
and an elastomer seat unit mounted within said flow passage intermediate the ends thereof,
said unit being of a size to be entirely passed into said flow passage to its final position,
said unit being separate from said body flanges,
said unit including an annular elastomer element projecting into the path of travel of said blade for engaging the blade in the closed position of the latter for forming a seal therewith,
said unit including an annular member permanently secured in place in said flow passage,
said elastomer element being of angular cross section and embracing a corner portion of said annular member in nesting relationship thereto and forming a seal therewith,
said unit including a retaining element of angular cross section embracing said elastomer member,
and means detachably securing said retaining element to said annular member.

5. In a gate valve having a body provided with end flanges for securement to the flanges of pipes to be associated with said valve,
said body having a flow passage,
a gate blade movable across said flow passage,
and an elastomer seat unit mounted within said flow passage intermediate the ends thereof,
said unit being of a size to be entirely passed into said flow passage to its final position,
said unit being separate from said body flanges,
said unit including an annular elastomer element projecting into the path of travel of said blade for engaging the blade in the closed position of the latter for forming a seal therewith,
said unit including an annular member permanently secured in place in said flow passage,
said elastomer element sealingly engaging said annular member,
and retaining means detachably secured to said annular member for holding said elastomer element in contact with said annular member whereby said elastomer element has sealing contact with said annular member at all times and has sealing contact with both said annular member and said gate blade in the closed position of the latter,
said retaining means providing for adjustment of the position of the blade contacting portions of said elastomer element while maintaining the seal between said elastomer element and said annular member.

6. In a gate valve having a body provided with end flanges for securement to the flanges of pipes to be associated with said valve,
said body having a flow passage,
a gate blade movable across said flow passage,
and an elastomer seat unit mounted within said flow passage intermediate the ends thereof,
said unit being of a size to be entirely passed into said flow passage to its final position,
said unit being separate from said body flanges,
said unit including an annular elastomer element projecting into the path of travel of said blade for engaging the blade in the closed position of the latter for forming a seal therewith,
said unit including an annular member permanently secured in place in said flow passage,
said elastomer element being of angular cross section and fitting on a corner portion of said annular member and forming a seal therewith,
said unit including a retaining element of angular cross section embracing said elastomer member,
and bolts passing through said retaining element and said elastomer element and into but not through said annular member for securing said retaining element to said annular member and pressing said elastomer element into sealing contact with both said annular member and said retaining element.

7. In a gate valve having a body provided with end flanges for securement to the flanges of pipes to be associated with said valve,
said body having a flow passage,
a gate blade movable across said flow passage,
and an elastomer seat unit mounted within said flow passage intermediate the ends thereof,
said unit being of a size to be entirely passed into said flow passage to its final position,
said unit being separate from said body flanges,
said unit including an annular elastomer element projecting into the path of travel of said blade for engaging the blade in the closed position of the latter for forming a seal therewith,
said unit including an annular member permanently secured in place in said flow passage, said elastomer element being of angular cross section and fitting on a corner portion of said annular member and forming a seal therewith, said unit including a retaining element of angular cross section embracing said elastomer member, and bolts passing through said retaining element and said elastomer element and into but not through said annular member for securing said retaining element to said annular member and pressing said elastomer element into sealing contact with both said annular member and said retaining element, said elastomer element having a rigid reinforcing element embedded therein, said reinforcing element being of angular cross section and having one leg portion thereof in one leg portion of said elastomer element and having another leg portion in the other leg portion of said elastomer element, said bolts passing through one leg portion of said reinforcing element.

8. In a gate valve having a body provided with end flanges for securement to the flanges of pipes to be associated with said valve, said body having a flow passage, a gate blade movable across said flow passage, and an elastomer seat assembly mounted within said flow passage intermediate the ends thereof, said assembly being of a size to be entirely passed into said flow passage to its final position, said body having an inwardly extending annular flange projecting into the flow passage at a place next to the blade, said assembly including an annular elastomer element having continuous engagement with said flange and projecting into the path of travel of said blade so that said elastomer element has full circular contact with said blade in the closed position of the latter, and an annular retaining member detachably secured to said flange and said elastomer element having a portion disposed between said retaining member and said flange in compressed sealing engagement with said flange and retaining member.

References Cited by the Examiner

UNITED STATES PATENTS 3,081,974   3/63   Traut _____ 251—328 X

FOREIGN PATENTS 762,830   12/56   Great Britain.

M. CARY NELSON, *Primary Examiner.*

MILTON KAUFMAN, *Examiner.*